(12) United States Patent
Ishii (10) Patent No.: US 8,161,474 B2
(45) Date of Patent: Apr. 17, 2012

(54) DIAGNOSTIC INFORMATION PRESERVATION DURING INSTALLATIONS OF OVER THE AIR UPDATE OF WIRELESS HANDSET SOFTWARE

(75) Inventor: Atsushi Ishii, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1130 days.

(21) Appl. No.: 12/002,109

(22) Filed: Dec. 14, 2007

(65) Prior Publication Data
US 2009/0156200 A1 Jun. 18, 2009

(51) Int. Cl.
*H04Q 7/34* (2006.01)

(52) U.S. Cl. ........ 717/176; 455/425; 455/412; 455/558; 709/224; 710/8; 710/15; 710/19; 710/104; 710/106; 713/1

(58) Field of Classification Search .......... 455/425; 379/433; 707/203; 717/1, 176; 710/8, 15, 710/19, 104, 106; 709/224
See application file for complete search history.

(56) References Cited

U.S. PATENT DOCUMENTS

| | | | |
|---|---|---|---|
| 5,951,687 A * | 9/1999 | Chan et al. ......................... 713/2 |
| 6,600,614 B2 | 7/2003 | Lenny et al. ...................... 360/31 |
| 6,728,830 B1 | 4/2004 | Assaf ............................ 711/112 |
| 6,751,681 B2 * | 6/2004 | Torii et al. ........................... 710/8 |
| 6,889,340 B1 | 5/2005 | Bramley, Jr. ....................... 714/6 |
| 6,918,052 B2 | 7/2005 | Bouchier et al. ................... 714/4 |
| 6,918,108 B2 * | 7/2005 | Rajaram ........................ 717/126 |
| 7,095,858 B2 * | 8/2006 | Wagner et al. ................. 380/281 |
| 7,203,560 B1 | 4/2007 | Wylie et al. .................... 700/110 |
| 2003/0032408 A1 * | 2/2003 | Jennings ....................... 455/412 |
| 2005/0132179 A1 | 6/2005 | Glaum et al. |
| 2007/0226334 A1 * | 9/2007 | Aoyagi et al. ................. 709/224 |
| 2008/0084993 A1 * | 4/2008 | Peddireddy et al. ...... 379/433.01 |

FOREIGN PATENT DOCUMENTS

| JP | 2003-209510 A | 7/2003 |
|---|---|---|
| JP | 2004-13714 A | 1/2004 |
| JP | 2005-235087 A | 9/2005 |
| JP | 2006-133889 A | 5/2006 |

* cited by examiner

*Primary Examiner* — Don Wong
*Assistant Examiner* — Lynda Dinh
(74) *Attorney, Agent, or Firm* — Scot A. Reader (57) ABSTRACT

A method and system for failsafe preservation of diagnostic information that identifies problems encountered during installation of over the air updates of wireless handset software includes logging code stored in an area of the handset that is not updated during over the air updates and that is executable to generate and store diagnostic information in an area of the handset that is not updated during over the air updates. By disposing a logging code and diagnostic information in areas of the handset that are invulnerable to corruption during installation of over the air updates, diagnostic information is guaranteed to be generated by the handset and transferable to an external diagnostics system for analysis even in the event of a fatal error.

11 Claims, 7 Drawing Sheets

DIAGNOSTIC INFORMATION PRESERVATION DURING INSTALLATIONS OF OVER THE AIR UPDATE OF WIRELESS HANDSET SOFTWARE

BACKGROUND OF THE INVENTION

The present invention relates to troubleshooting problems encountered during installation of over the air updates of wireless handset software and, more particularly, to failsafe preservation of diagnostic information that identifies such problems.

Wireless handsets, such as cellular phones, personal data assistants (PDAs) and pocket personal computers (PCs), are becoming increasingly sophisticated. This increased sophistication has brought with it more complex software and a higher incidence of coding errors, called software bugs. This increased sophistication has also led to more frequent availability of software upgrades that enhance the functionality of such handsets. To remove software bugs and enable software upgrades, software updates are disseminated and installed on such handsets.

To more efficiently distribute software updates to a large installed base of wireless handsets, techniques that download software updates to such handsets over the air have been deployed. In such wireless download schemes, a software update package providing instruction on how to update a wireless handset is typically pushed or pulled over the air from a software update server in a network infrastructure to the handset.

A technical challenge that arises during over the air software updates is how to preserve diagnostic information that identifies problems encountered during installation of such updates. Some wireless handsets have diagnostics software that can generate and transmit diagnostic information from the handset to an external diagnostics system via a wired interface of the handset for analysis. However, such diagnostics software is typically stored in the program/data area of the handset's nonvolatile memory. If a fatal error occurs during installation of an over the air update of the handset software, the program/data area may become corrupted and prevent the diagnostics software from outputting the diagnostic information to the external diagnostics system. Without such diagnostic information, analysis of the fatal error is more difficult.

SUMMARY OF THE INVENTION

The present invention, in a basic feature, provides failsafe preservation of diagnostic information that identifies problems encountered during installation of over the air updates of wireless handset software. Failsafe preservation of diagnostic information is enabled by logging code stored in an area of the handset that is not updated during over the air updates and that is executable to generate and store diagnostic information in an area of the handset that is not updated during over the air updates. By disposing logging code and diagnostic information in areas of the handset that are invulnerable to corruption during installation of over the air updates, diagnostic information is guaranteed to be generated by the handset and transferable to an external diagnostics system for analysis even in the event of a fatal error.

In one aspect of the invention, a wireless handset comprises a wireless interface, at least one memory including at least one updateable area having updateable code stored therein, a first non-updateable area having non-updateable code stored therein and a second non-updateable area adapted to store diagnostic information, and a processor communicatively coupled with the wireless interface and the memory, wherein the processor executes a first portion of the non-updateable code to initiate installation of an update to the updateable code using information from an update package received via the wireless interface, and wherein the processor executes a second portion of the non-updateable code to store during the installation in the second non-updateable area diagnostic information for a problem encountered during the installation.

In some embodiments, the memory comprises a nonvolatile memory and the second non-updateable area is an area of the nonvolatile memory reserved for storing diagnostic information.

In some embodiments, the memory comprises a random access memory (RAM) and a nonvolatile memory, the second non-updateable area is an area of the RAM, and the processor executes a third portion of the non-updateable code to transfer the diagnostic information from the RAM to an update package area of the nonvolatile memory after the installation is terminated.

In some embodiments, the handset further comprises a wired interface communicatively coupled with the processor and the processor executes a third portion of the non-updateable code to facilitate outputting of the diagnostic information via the wired interface to a diagnostics system external to the handset.

In some embodiments, the handset further comprises a wired interface communicatively coupled with the processor, the memory comprises a RAM, data retrieval code received via the wired interface from a diagnostics system external to the handset is loaded in the RAM and the processor executes the data retrieval code to facilitate outputting of the diagnostic information via the wired interface to the diagnostics system.

In some embodiments, the diagnostic information comprises a debug message.

In some embodiments, the diagnostic information comprises an error code.

In some embodiments, the first portion of the non-updateable code comprises an update client.

In some embodiments, the second portion of the non-updateable code comprises a logging client.

In some embodiments, the first portion and the second portion of the non-updateable code are stored in a boot code area of the memory.

In some embodiments, the at least one non-updateable area comprises a boot code area and a diagnostic information area.

In some embodiments, the at least one updateable area comprises a program/data area and a file system area.

In another aspect of the invention, a nonvolatile memory for a wireless handset comprises at least one updateable area having updateable code stored therein, a first non-updateable area having update code and logging code stored therein and a second non-updateable area adapted to store diagnostic information, wherein the update code is executed to initiate installation of an update to the updateable code using information from an over the air update package stored in the memory and wherein during the installation the logging code is executed to store in the second non-updateable area diagnostic information for a problem encountered during the installation.

In some embodiments, the non-updateable area further comprises code executed to facilitate outputting after the installation is terminated of the diagnostic information to a diagnostics system external to the handset.

In some embodiments, the update code and the logging code are stored in a boot code area of the memory.

In some embodiments, the at least one non-updateable area comprises a boot code area and a diagnostic information area.

In some embodiments, the at least one updateable area comprises a program/data area and a file system area.

In some embodiments, the diagnostic information comprises at least one of a debug message or an error code.

In yet another aspect of the invention, a method for failsafe preservation of diagnostic information for problems encountered during installation of an over the air update of wireless handset software comprises the steps of receiving an update package via a wireless interface of a wireless handset, initiating installation of an update to code stored in an updateable area of a nonvolatile memory of the wireless handset using code stored in a first non-updateable area of the nonvolatile memory and information from the update package and storing in a second non-updateable area of the nonvolatile memory diagnostic information for a problem encountered during the installation.

In some embodiments, the method further comprises the step of outputting the diagnostic information to a diagnostics system external to the wireless handset after the installation is terminated.

These and other aspects of the invention will be better understood by reference to the following detailed description taken in conjunction with the drawings that are briefly described below. Of course, the invention is defined by the appended claims.

DETAILED DESCRIPTION OF A PREFERRED EMBODIMENT

Figure 1:
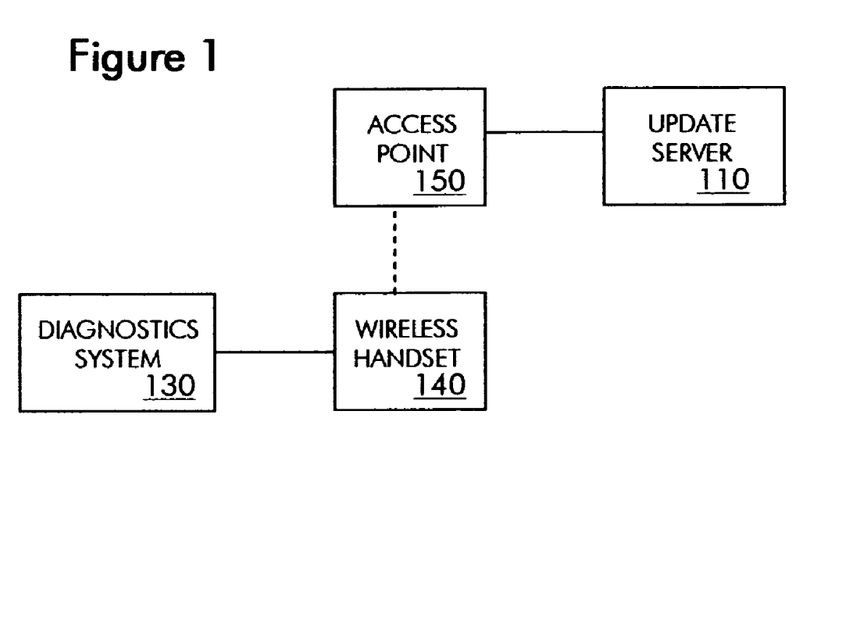
FIG. 1 shows a communication system in which a wireless handset receives over the air software updates.

In FIG. 1, a communication system in which a wireless handset 140 receives over the air software updates is shown. The system includes a software update server 110 in a network infrastructure. Server 110 may reside in an enterprise network or a service provider network, for example. Server 110 has wired connectivity with an access point 150, such as a cellular base station or a wireless local area network (LAN) access point. The connectivity may be direct or via one or more intervening data communication nodes, such as routers, switches and bridges. Access point 150 has wireless connectivity with handset 140 via an over the air link. The over the air link may by any of various types of wireless links over which data may be transmitted, such as a cellular link or a wireless LAN link. Handset 140 may be a phone, a PDA or a pocket PC or another type of handheld communication device having a wireless interface. Handset 140 is also removably coupled via a wired link, such as a wired LAN link or a universal serial bus (USB) link, with a diagnostics system 130, which may be a desktop or notebook PC having diagnostics software installed thereon.

Software update server 110 distributes software updates to an installed base of one or more mobile electronic devices, such as wireless handset 140. The installed base may include, for example, a group of mobile electronic devices owned by a common enterprise or used by a subscriber group. Software update types include, for example, patches with corrective code and upgrades with code that supports new features or functionality. In some embodiments, server 110 prepares and downloads to mobile electronic devices delta packages reflective of differences between current versions of software running on mobile electronic devices and replacement versions of software to be installed on mobile electronic devices. In such embodiments, server 110 compares the current version of software running on a mobile electronic device with a replacement version of software stored on server 110 to determine an update path and uses the update path to generate an appropriate delta package for the mobile electronic device. The mobile electronic device receives the delta package from server 110 and after reboot executes the delta package to update to the replacement version. In some embodiments, software updates are pulled from server 110 pursuant to requests made by mobile electronic devices. In other embodiments, software updates are pushed by server 110 to mobile electronic devices independent of any request. The software being updated is oftentimes firmware.

Figure 2:
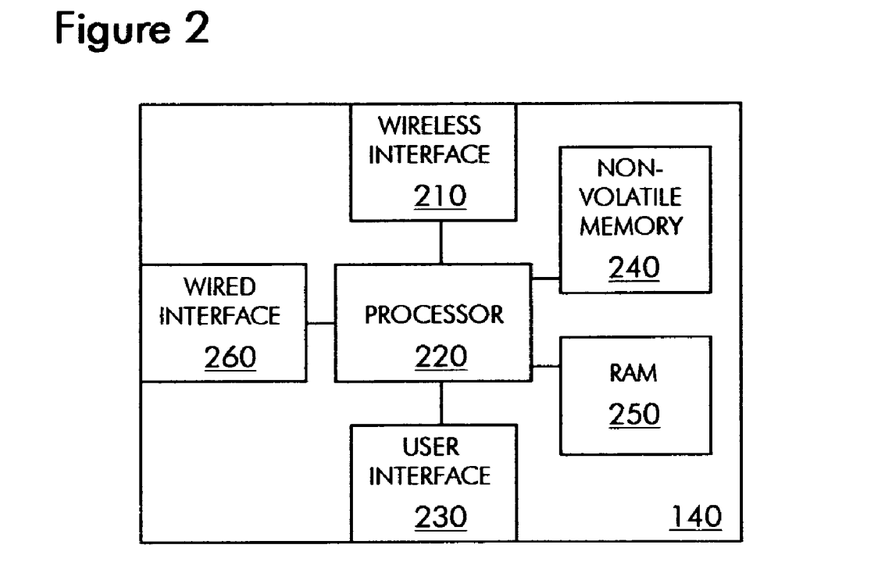
FIG. 2 shows the wireless handset of FIG. 1 in more detail.

Turning to FIG. 2, wireless handset 140 is shown in more detail. Handset 140 includes a wireless interface 210 adapted to transmit and receive data in accordance with a wireless communication protocol, such as a cellular or wireless LAN protocol. Handset 140 further includes a wired interface 260 adapted to transmit and receive data in accordance with a wired communication protocol, such as a wired LAN or USB protocol. Handset 140 further includes a user interface 230 adapted to transmit outputs and receive inputs from a user of handset 140. User interface may, for example, include an output mechanism such as a liquid crystal display (LCD) and a mechanism for receiving user input such as a keypad or touch-sensitive navigation tool. Handset 140 further includes a nonvolatile memory 240 adapted to store updateable and non-updateable software, as well as a RAM 250. Handset 140 further includes a processor 220 adapted to execute software stored in nonvolatile memory 240 and interoperate with elements 210, 230, 240, 250, 260 to perform various features and functions supported by handset 140, including the methods and systems for failsafe preservation of diagnostic information identifying problems encountered during installation of over the air updates of wireless handset software described herein.

Figure 3:
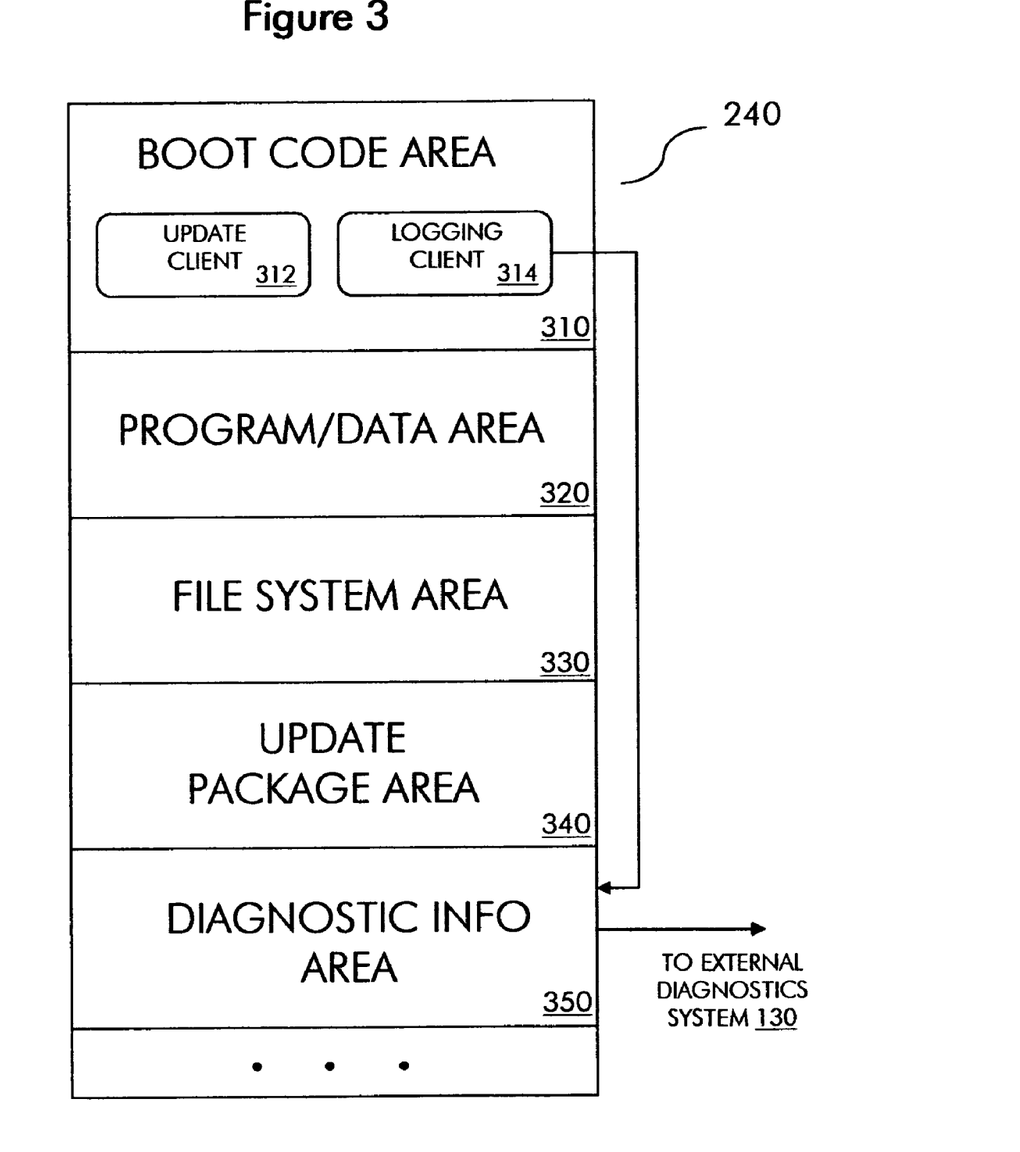
FIG. 3 shows a nonvolatile memory of the wireless handset of FIG. 2 in some embodiments of the invention.

Turning to FIG. 3, nonvolatile memory 240 of FIG. 2 is shown in more detail. Nonvolatile memory 240 may be a flash memory, for example. Memory 240 has multiple areas at predefined locations that together store the complete executable software image on handset 140. The areas include a boot code area 310, a program/data area 320, a file system area 330, an update package area 340 and a diagnostic information area 350. Boot code area 310 and diagnostic information area 350 are not updateable through over the air software updates whereas program/data area 320 and file system area 330 are updateable through over the air software updates.

Boot code area 310 stores code that executes at power-up to initialize handset 140 and communicate via wired interface 260 with any detected externally attached device. Boot code area 310 also has an update client 312 that executes at power-up to install any detected over the air software update (e.g. delta package) that has been received via wireless interface 210 and stored in update package area 340 since the last boot sequence. Boot code area 310 also has a logging client 314 that executes to generate and store any diagnostic information that identifies problems encountered during installation of an over the air software update.

Program/data area 320 stores code that executes at runtime, such as operating system code, application code, communication protocol code, device driver code, and associated data.

File system area 330 stores in files data saved and retrieved by applications.

Update package area 340 stores over the air software update packages, such as delta packages, downloaded from software update server 110 via wireless interface 210. Such update packages instruct update client 312 how to re-write program/data area 320 and file system area 330 when installing an over the air software update.

Diagnostic information area 350 is an area reserved for storing diagnostic information that is generated by logging client 314 and that identifies problems encountered during installation of an over the air software update. Such diagnostic information includes, for example, one or more of debug messages or error codes.

Figure 4:
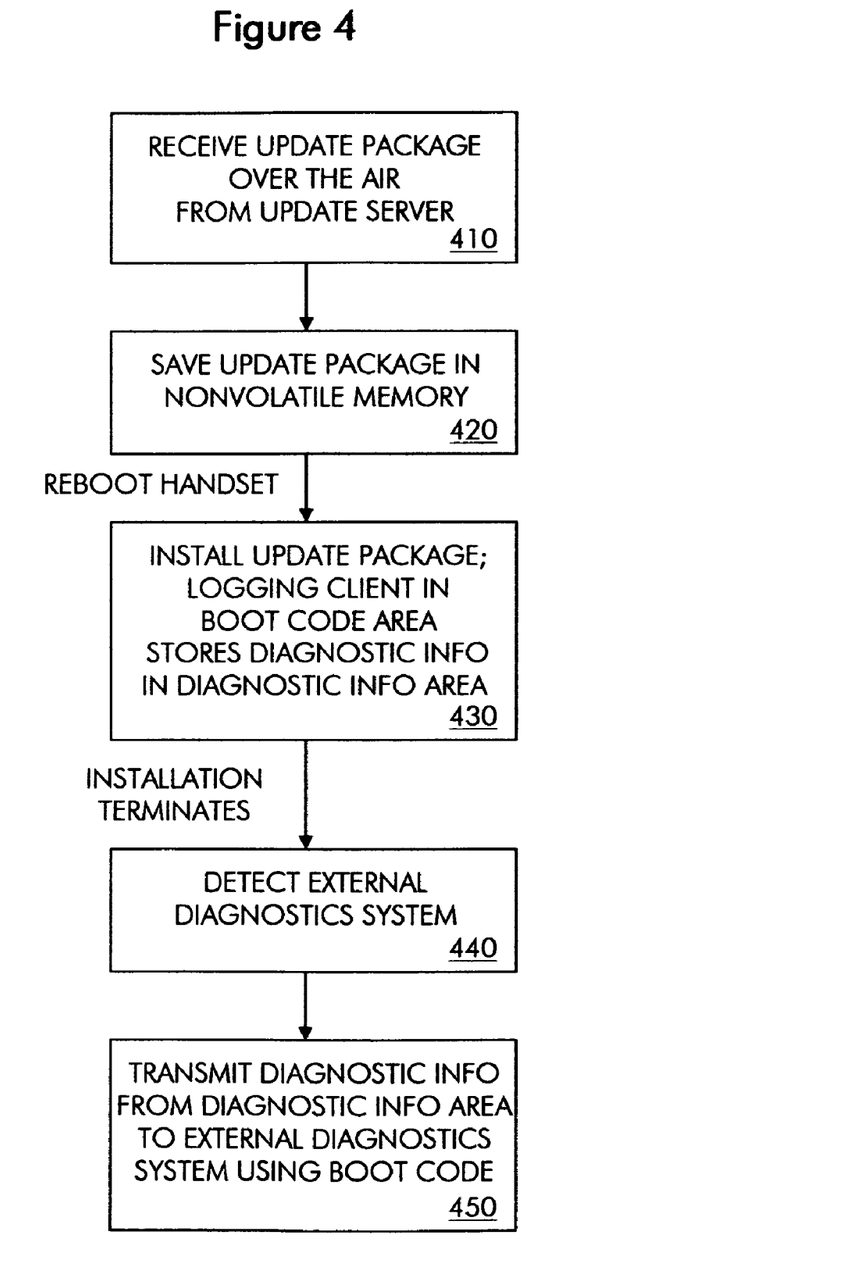
FIG. 4 shows a method for failsafe preservation of diagnostic information that identifies problems encountered during installation of over the air updates of wireless handset software in some embodiments of the invention.

FIG. 4 shows a method for failsafe preservation of diagnostic information identifying problems encountered during installation of over the air updates of wireless handset software in some embodiments of the invention. An over the air software update package is received via wireless interface 210 from software update server 110 (410) and processor 220 saves the package in update package area 340 (420). Eventually, handset 140 is rebooted. Upon power-up, code in boot code area 310 detects the package prompting update client 312 to execute and begin installing the package, which involves re-writing part of program/data area 320 and/or file system area 330. Meanwhile, logging client 314 executes and generates and stores in diagnostic information area 350 diagnostic information, such as debug messages and error codes, that identifies problems encountered during installation of the package (430). Installation thereafter terminates, either as a result of completion or a fatal error. Eventually, code in boot code area 310 detects connectivity via wired interface 260 with external diagnostics system 130 (440) and facilitates outputting of the diagnostic information stored in diagnostic information area 350 to external diagnostics system 130 for analysis (450). Since boot code area 310 and diagnostic information area 350 remain in-tact during the update and are not subject to corruption, diagnostic information is guaranteed to be generated, preserved and transferable to external diagnostics system 130 even in the event of a fatal error.

Figure 5:
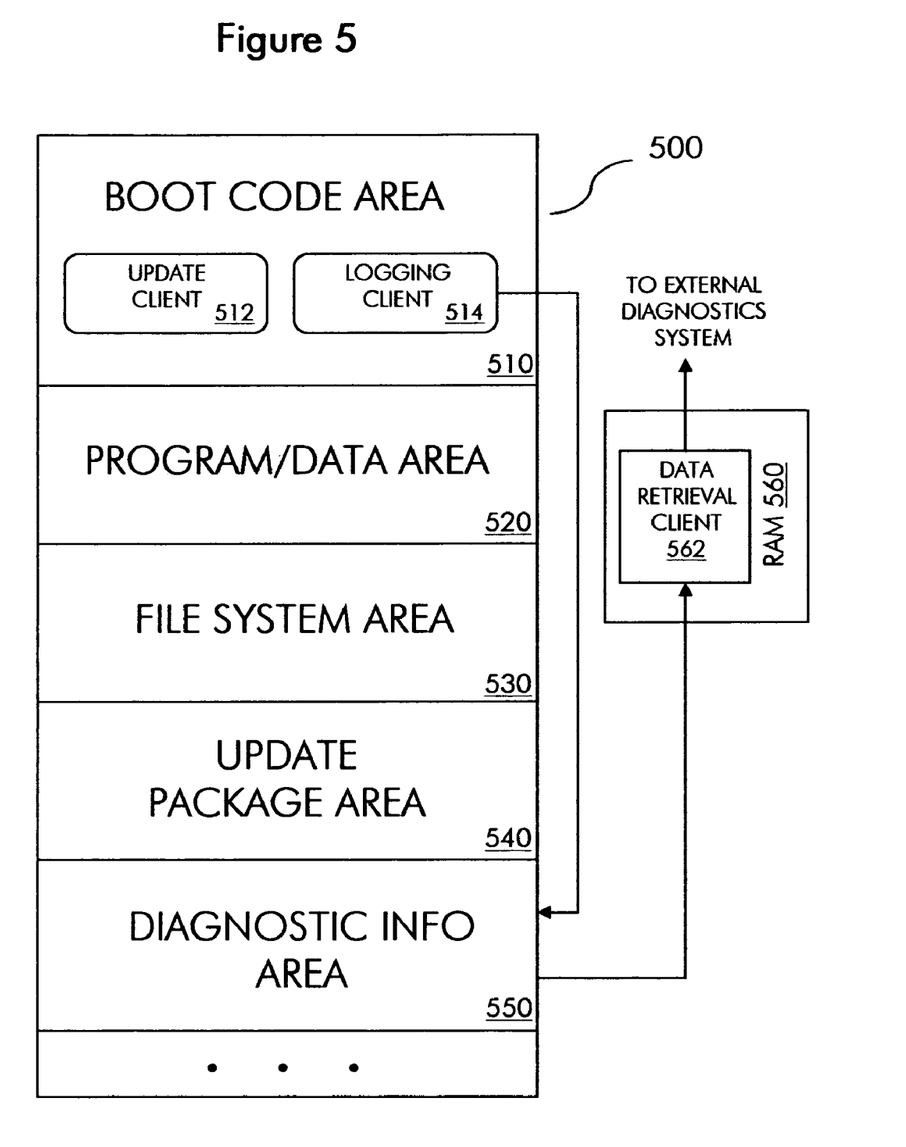
FIG. 5 shows a memory of a wireless handset in other embodiments of the invention.

FIG. 5 shows a memory of a wireless handset in other embodiments of the invention. In these embodiments, the memory includes a nonvolatile memory 500 and further includes a RAM 560 having a data retrieval client 560 thereon. Data retrieval client 560 is code loaded into RAM 560 by an external diagnostics system during a boot sequence and is executable to facilitate outputting to the external diagnostics system of diagnostic information generated and stored in diagnostic information area 550 during installation of an over the air software update. Invoking data retrieval client 560 loaded in RAM 560, rather than boot code, to facilitate outputting of the diagnostic information provides for boot code of reduced complexity.

Figure 6:
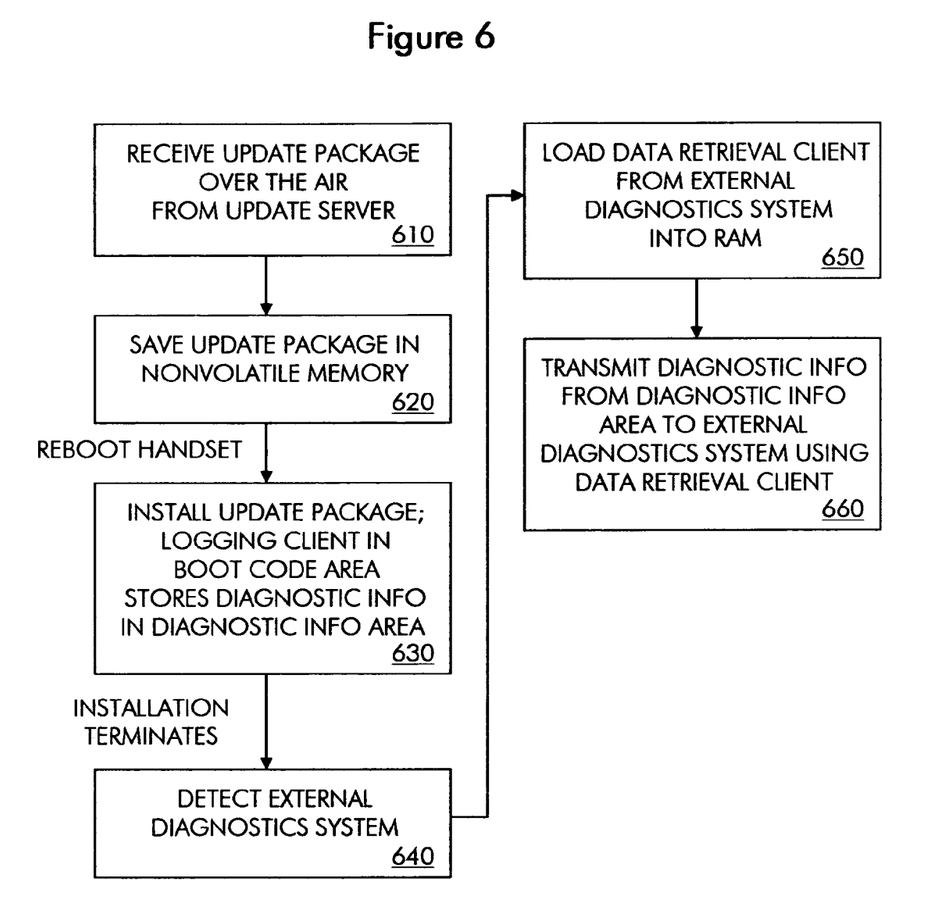
FIG. 6 shows a method for failsafe preservation of diagnostic information that identifies problems encountered during installation of over the air updates of wireless handset software in other embodiments of the invention.

FIG. 6 shows a method for failsafe preservation of diagnostic information in accordance with the arrangement shown in FIG. 5. An over the air software update package is received via a wireless interface of a wireless handset from a software update server (610) and a processor on the handset saves the package in update package area 540 (620). Eventually, the handset is rebooted. Upon power-up, code in boot code area 510 detects the package prompting update client 512 to execute and begin installing the package, which involves re-writing part of program/data area 520 and/or file system area 530. Meanwhile, logging client 514 executes and generates and stores in diagnostic information area 550 diagnostic information, such as debug messages and error codes, that identifies problems encountered during installation of the package (630). Installation thereafter terminates, either as a result of completion or a fatal error. Eventually, code in boot code area 510 detects connectivity via a wired interface of the handset with an external diagnostics system (640) and facilitates loading of data retrieval client 562 into RAM 560 (650). Data retrieval client 562 executes and facilitates outputting of the diagnostic information stored in diagnostic information area 550 to the external diagnostics system for analysis (660).

Figure 7:
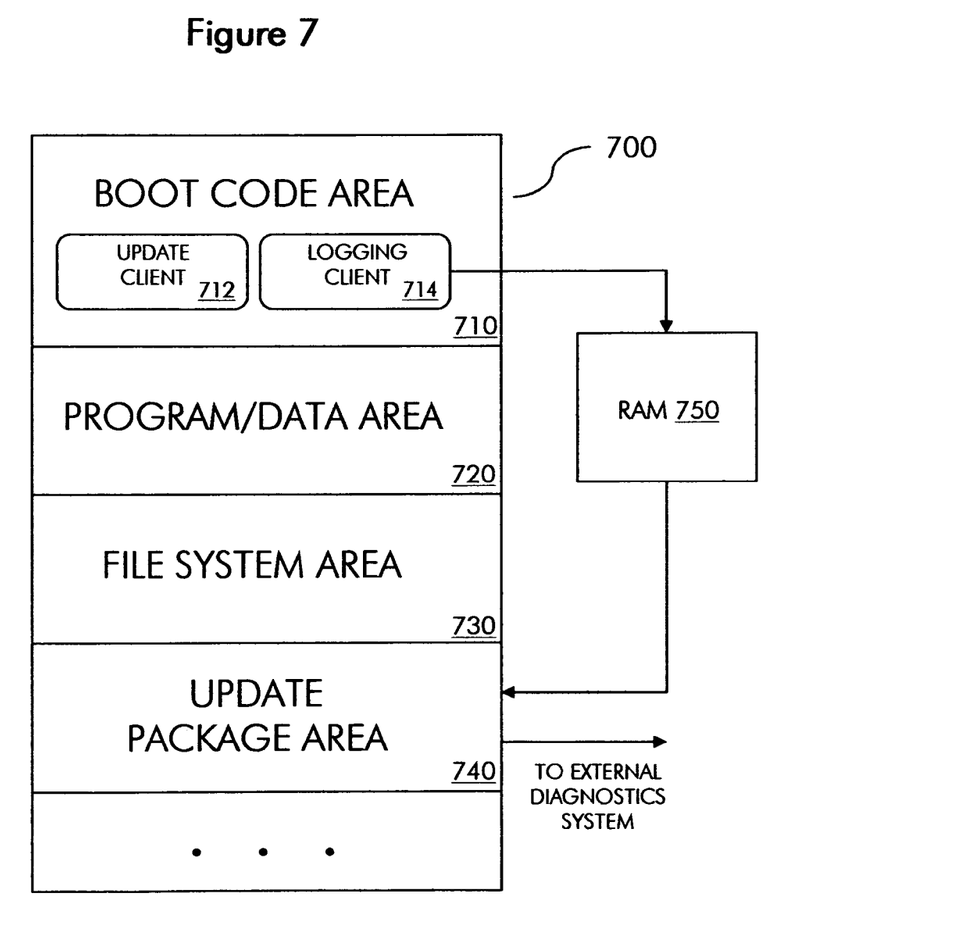
FIG. 7 shows a memory of a wireless handset in still other embodiments of the invention.

FIG. 7 shows a memory of a wireless handset in still other embodiments of the invention. In these embodiments, the diagnostic information are cached in RAM 750 during installation and transferred to the update package area 740 after installation, eliminating the requirement of an area in nonvolatile memory 700 reserved for storing diagnostic information. These embodiments also require less processing power by reducing writes to nonvolatile memory.

Figure 8:
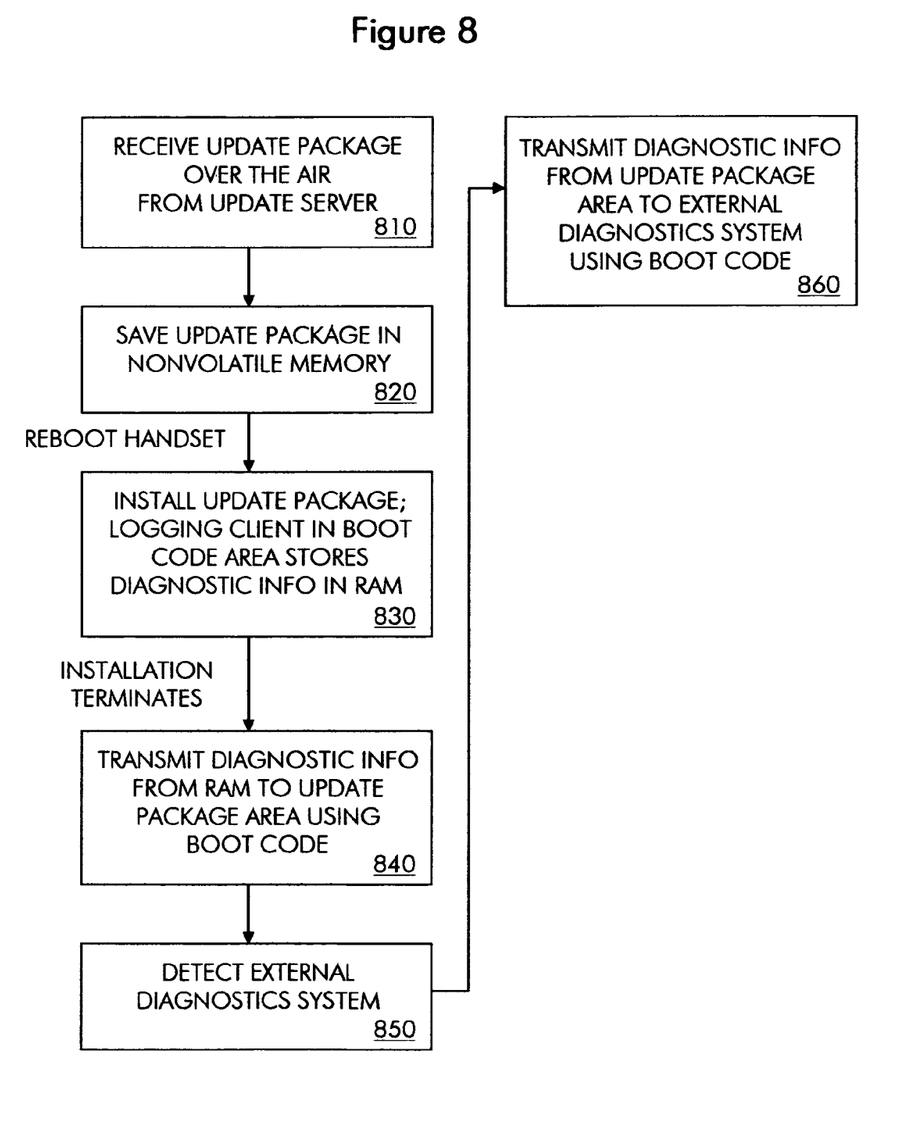
FIG. 8 shows a method for failsafe preservation of diagnostic information that identifies problems encountered during installation of over the air updates of wireless handset software in still other embodiments of the invention.

FIG. 8 shows a method for failsafe preservation of diagnostic information in accordance with the arrangement shown in FIG. 7. An over the air software update package is received via a wireless interface of a wireless handset from a software update server (810) and a processor on the handset saves the package in update package area 740 (820). Eventually, the handset is rebooted. Upon power-up, code in boot code area 710 detects the package prompting update client 712 to execute and begin installing the package, which involves re-writing part of program/data area 720 and/or file system area 730. Meanwhile, logging client 714 executes and generates and stores in RAM 750 diagnostic information, such as debug messages and error codes, that identifies problems encountered during installation of the package (830). Installation thereafter terminates, either as a result of completion or a fatal error. Code in boot code area 710 then transfers the diagnostic information stored in RAM 750 to update package area 740 (840). Eventually, code in boot code area 710 detects connectivity via a wired interface of the handset with an external diagnostics system (850) and facilitates outputting of the diagnostic information stored in diagnostic information area 350 to external diagnostics system 130 for analysis (860).

It will be appreciated by those of ordinary skill in the art that the invention can be embodied in other specific forms without departing from the spirit or essential character hereof. The present description is therefore considered in all respects to be illustrative and not restrictive. The scope of the invention is indicated by the appended claims, and all changes that come with in the meaning and range of equivalents thereof are intended to be embraced therein.

What is claimed is:

1. A wireless handset, comprising:
   a wireless interface;
   at least one memory including at least one updateable area having updateable code stored therein, a first non-updateable area having non-updateable code stored therein and a second non-updateable area adapted to store diagnostic information, wherein the memory comprises a random access memory (RAM) and a nonvolatile memory and the second non-updateable area is an area of the RAM adapted to store diagnostic information; and a processor communicatively coupled with the wireless interface and the memory;

wherein the processor executes a first portion of the non-updateable code to initiate installation of an update to the updateable code using information from an update package received via the wireless interface; wherein the processor executes a second portion of the non-updateable code to store during the installation in the second non-updateable area diagnostic information for a problem encountered during the installation; wherein the processor executes a third portion of the non-updateable code to transfer the diagnostic information from the RAM to an update package area of the nonvolatile memory after the installation is terminated; and wherein the first portion and the second portion of the non-updateable code are stored in a boot code area of the memory.

2. The handset of claim 1, further comprising a wired interface communicatively coupled with the processor, wherein the processor executes a portion of the non-updateable code to facilitate outputting of the diagnostic information via the wired interface to a diagnostics system external to the handset.

3. The handset of claim 1, wherein the diagnostic information comprises a debug message.

4. The handset of claim 1, wherein the diagnostic information comprises an error code.

5. The handset of claim 1, wherein the first portion of the non-updateable code comprises an update client.

6. The handset of claim 1, wherein the second portion of the non-updateable code comprises a logging client.

7. The handset of claim 1, wherein the at least one updateable area comprises a program or data area and a file system area.

8. A nonvolatile memory for a wireless handset, comprising:

at least one updateable area having updateable code stored therein;

a first non-updateable area having update code and logging code stored therein; and a second non-updateable area adapted to store diagnostic information;

wherein the update code is executed to initiate installation of an update to the updateable code using information from an over the air update package stored in the memory; wherein during the installation the logging code is executed to store in the second non-updateable area diagnostic information for a problem encountered during the installation; wherein at least one of the non-updateable areas comprises code executed to facilitate outputting after the installation is terminated of the diagnostic information to a diagnostics system external to the handset; wherein at least one of the non-updateable areas comprises a boot code area; and wherein at least one of the non-updateable areas comprises a diagnostic information area.

9. The memory of claim 8, wherein the at least one updateable area comprises a program or data area and a file system area.

10. The memory of claim 8, wherein the diagnostic information comprises at least one of a debug message or an error code.

11. A method for failsafe preservation of diagnostic information for problems encountered during installation of an over the air update of wireless handset software, comprising the steps of:

receiving an update package via a wireless interface of a wireless handset;

initiating installation of an update to code stored in an updateable area of a nonvolatile memory of the wireless handset using code stored in a first non-updateable area of the nonvolatile memory and information from the update package, wherein the first non-updateable area has non-updateable code stored therein; and storing in a second non-updateable area of a random access memory (RAM) using code stored in the first non-updateable area of the nonvolatile memory diagnostic information for a problem encountered during the installation, wherein the second non-updateable area is adapted to store diagnostic information, wherein a first portion and a second portion of the non-updateable code are stored in a boot code area of the nonvolatile memory;

executing a third portion of the non-updateable code to transfer the diagnostic information from the random access memory (RAM) to an update package area of the nonvolatile memory, and outputting the diagnostic information to a diagnostics system external to the wireless handset after the installation is terminated.

* * * * *